Dec. 28, 1926.

H. W. LORMOR

COATING DEVICE

Filed June 19, 1922    2 Sheets-Sheet 1

Inventor:
Henry W. Lormor.
by
Thurston Rivet Hudson
attys.

Dec. 28, 1926.  
H. W. LORMOR  
COATING DEVICE  
Filed June 19, 1922  
1,612,452  
2 Sheets-Sheet 2

Inventor  
Henry W. Lormor.  
by Thurston Kwit & Hudson  
attys.

Patented Dec. 28, 1926.

1,612,452

UNITED STATES PATENT OFFICE.

HENRY W. LORMOR, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

COATING DEVICE.

Application filed June 19, 1922. Serial No. 569,482.

This invention relates to a coating device for coating the walls of an opening with a lubricant or combined lubricant and sealing device, so as to permit the ready insertion of the part which is to be subsequently fitted into the opening. More particularly, the invention relates to a device adapted to coat the inner openings of bushings, sleeves or the like on storage battery covers, so that the covers can be fitted onto the top of storage batteries and the terminal posts readily extended through such bushings.

At the present time it is customary to fit the terminal post openings of a storage battery cover with rubber bushings through which the terminal posts are adapted to extend, and which are designed to tightly grip the terminal posts to prevent leakage of electrolyte. The tightness of the fit between the bushings and the post is such that considerable difficulty is encountered in slipping the bushings along the posts when the cover is fitted to the top of the battery, and to minimize this difficulty the inner walls of the bushings are swabbed or coated with a liquid or semi-liquid substance which will have a lubricating action, and preferably also a sealing action after the bushings are in their final positions on the posts. This swabbing or coating of the bushings when done by the ordinary way is time consuming, and for that reason is objectionable for the production of batteries in quantities.

The principal object of the present invention is to provide a device by which the coating can be done effectively but with great rapidity.

The invention may be briefly summarized as consisting in certain novel details of construction and combinations and arrangements of parts which will be described in the specification and set forth in the appended claims.

Figure 1:
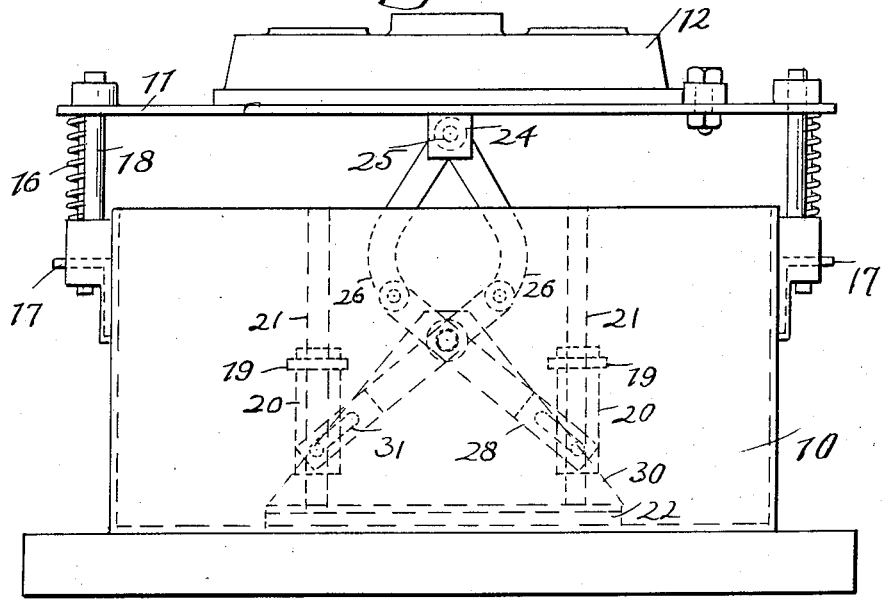
Figure 2:
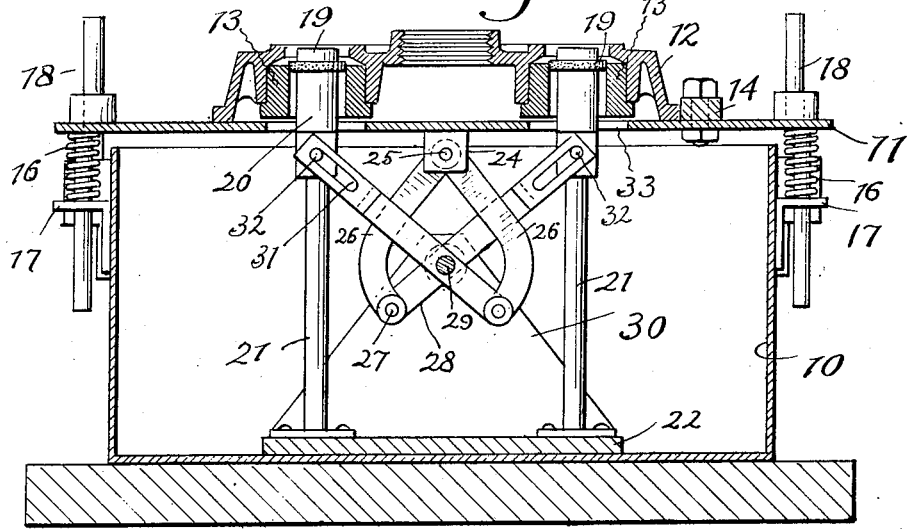
Figure 3:
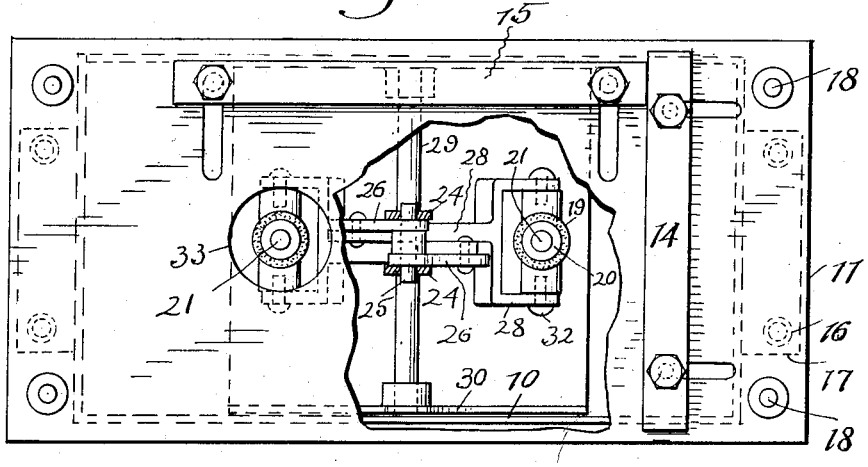
Figure 4:
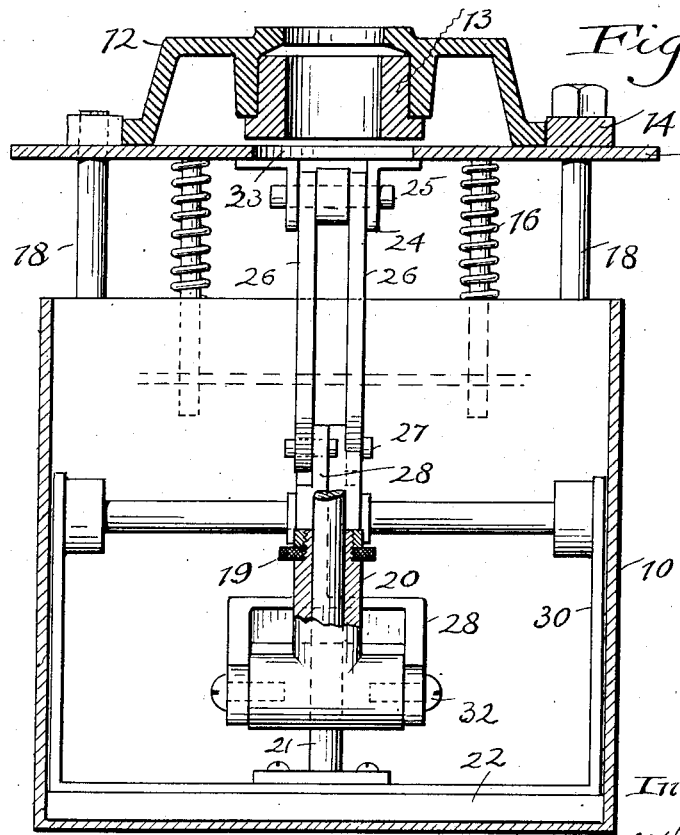

In the accompanying sheets of drawings wherein I have illustrated a device for coating bushings fitted into openings of storage battery covers, Fig. 1 is a side elevation of the device; Fig. 2 is a vertical longitudinal sectional view; Fig. 3 is a top plan view with part of the top plate broken away; Fig. 4 is a transverse sectional view on an enlarged scale with portions broken away.

In carrying out my invention I use a receptacle 10 in the form of a tank, which may be and preferably is rectangular in shape, this receptacle being adapted to receive the solution or other substance which is used for coating purposes.

Above this receptacle there is a vertical depressible platform 11 on which the device to be coated is placed. This device in this instance consists of a storage battery cover 12 carrying a pair of rubber bushings 13 with central openings through which the terminal posts of the battery are adapted to be extended. In the embodiment shown the device is for the purpose of applying lubricating or combined lubricating and sealing substance so as to coat the inner walls forming the openings in these bushings.

In accordance with the present invention the device to be coated is placed on the depressible platform, 11, and when the latter is lowered, a swab, which is normally in the solution or other substance in the receptacle, is elevated and is extended through the opening of the device to be coated. The number of such swabs will depend upon the number of openings to receive the coating substance, and this will depend upon the character of the article being treated, and in the case of storage battery covers having two openings and two bushings there will be two swabs.

For the purpose of readily positioning the cover so that its openings will be directly above the swabs, the platform is provided with a pair of gauges 14 and 15, against which one end and one side of the cover are adapted to be placed to bring the openings in registry with the swabs. Preferably the back gauge 15 is adjustable to adapt the device for covers of different widths, and should also the length of the cover vary, the gauge 14 could be made adjustable in like manner.

The platform is supported on springs 16 resting on short shelves 17 at the ends of the receptacle 10, and the platform is guided for vertical movement by vertical guide pins 18 secured to the ends of the receptacle, and extending up through bushings or bosses on the top of the platform 11.

The swabs which apply the coating substance into the openings of the devices being coated are shown at 19, these swabs being preferably in the form of cylindrical disks or washers which may be formed ot felt, and their diameter is such that they will enter the openings in the devices to be coated and apply the substance to the walls forming such openings. These swabs 19 are carried by vertically movable members 20 slidingly arranged on a pair of upright posts 21 extending up from a plate 22 secured to the base of the receptacle 10 as clearly shown in Fig. 2, For the purpose of elevating these slides 20 and the swabs 19 when the platform 11 is depressed, there is attached to the under side of the platform 11, and at the center thereof a bracket 24 carrying a transverse pin 25 to which is pivotally connected the upper ends of a pair of links 26. These links at their lower ends are pivotally connected at 27 to the short arms of a pair of cross levers 28 pivotally mounted on a transverse shaft 29 supported in a pair of end plates 30 extending up from the base or plate 22. Of course, if desired, this shaft 29 could be supported directly in the side walls of the receptacle. The outer and longer ends of these levers 28 are forked, and the forked ends embrace the slides 20 and are connected thereto by a pin and slot connection, the forked ends having slots 31 and the slides having laterally projecting pins 32 which engage the slots.

Before the platform is depressed the parts have the relative positions indicated in Fig. 1. The swabs now are beneath the top of the solution or semi-solution in the receptacle 10 so as to be thoroughly impregnated with the coating substance. Then the device to be coated is placed on the platform as shown in Fig. 1, the gauges permitting it to be quickly placed in proper position with reference to the swabs. Then by pressure on this device the platform is lowered, the operator usually placing the device 12 on the platform against the gauges, and pressing it down by hand with practically one motion.

As the platform is lowered, the links 26 swing the forked ends of the levers 28 upwardly, and this elevates the slides 20 so that the swabs 19 are extended up through openings 33 in the platform and into the bushings 13 or other devices to be coated so as to apply the coating substance to the inner walls of the bushings. Then the operator releases the pressure, the platform is elevated by the springs 16, and the swabs are lowered and again recede into the coating substance in the receptacle. This operation is done exceedingly quickly, and with this device a large number of covers can be coated in the space of time usually required to coat one cover by hand.

I have employed successfully various coating substances; one that is preferred consists of a rubber cement in liquid form. This has the property of serving as a lubricant when in liquid form to facilitate the application of the cover to the storage battery, but after the cement dries it serves to seal the terminal posts in the rubber bushings. I have also used advantageously vaseline and soap water. These substances are very desirable for lubricating purposes, but are not so effective for the purpose of forming a seal as the rubber cement.

While I have shown simply the preferred construction, and though I have shown the construction adapted for accommodating storage battery covers, I do not wish to be confined to the precise details or arrangements shown, nor to a coating device adapted for handling storage battery covers only. While the principle of the invention will be the same regardless of the shape or purpose of the article coated, the form of the coating device will vary somewhat with the character of the article being accommodated thereon. Likewise, the number of swabs which are actuated simultaneously when the platform is depressed may be varied, the number depending on the nature of the article being coated, and depending usually upon the number of openings in the article, though I consider it within the scope of my invention to simultaneously coat if desired, a number of articles each having one or more openings.

Having described my invention, I claim:

1. In a coating device, a receptacle for a coating substance, a platform above the same and having an opening, a swab in the receptacle, and means connecting the platform to the swab so that when the platform is lowered the swab will be extended up through said opening in the platform and may engage the surface of the article to be coated.

2. In a coating device, a receptacle for a coating substance, a vertically movable platform above the same, said platform having an opening and means for positioning an article thereon with an opening in the article in registry with the opening of the platform, a swab in the receptacle and means connecting the platform to the swab so that when the platform is lowered the swab will be extended up through said opening in the platform and into the opening in the article supported thereon.

3. In a device for coating the walls of openings in storage battery covers, a receptacle for a coating substance, a swab in the receptacle, a vertically movable platform for supporting a mold cover above the same, said platform having means engageable with a storage battery cover to position its opening in alignment with the swab, and means connecting the platform and swab so that when the platform is lowered the swab will be elevated into the opening of the cover to apply a coating to the wall thereof.

In testimony whereof, I hereunto affix my signature.

HENRY W. LORMOR.